US012146620B2

(12) United States Patent
Li

(10) Patent No.: US 12,146,620 B2
(45) Date of Patent: Nov. 19, 2024

(54) LED LAMP WITH A DOUBLE-SEGMENT-NESTED CUP DESIGN

(71) Applicant: SHENZHEN WANJIA LIGHTING CO., LTD., Shenzhen (CN)

(72) Inventor: Fei Li, Shenzhen (CN)

(73) Assignee: SHENZHEN WANJIA LIGHTING CO., LTD., Shenzhen (CN)

( * ) Notice: Subject to any disclaimer, the term of this patent is extended or adjusted under 35 U.S.C. 154(b) by 0 days.

(21) Appl. No.: 18/639,984

(22) Filed: Apr. 19, 2024

(65) Prior Publication Data

US 2024/0263750 A1 Aug. 8, 2024

Related U.S. Application Data

(63) Continuation-in-part of application No. PCT/CN2023/096462, filed on May 26, 2023.

(30) Foreign Application Priority Data

Jan. 9, 2023 (CN) ......................... 202310028586.1

(51) Int. Cl.

| | |
|---|---|
| ***F21V 23/00*** | (2015.01) |
| ***F21K 9/233*** | (2016.01) |
| ***F21K 9/238*** | (2016.01) |
| ***F21K 9/69*** | (2016.01) |
| ***F21V 29/77*** | (2015.01) |

(52) U.S. Cl.

CPC .............. *F21K 9/233* (2016.08); *F21K 9/238* (2016.08); *F21K 9/69* (2016.08); *F21V 29/773* (2015.01)

(58) Field of Classification Search

CPC ............................. F21V 23/006; F21V 23/009
USPC .......................................................... 362/294
See application file for complete search history.

(56) References Cited

U.S. PATENT DOCUMENTS

| | | | | |
|---|---|---|---|---|
| 6,948,829 B2 * | 9/2005 | Verdes | F21V 3/00 | 315/71 |
| 8,449,154 B2 * | 5/2013 | Uemoto | F21V 23/009 | 362/249.02 |
| 8,740,415 B2 * | 6/2014 | Wheelock | F21K 9/232 | 362/373 |
| 2011/0286200 A1 * | 11/2011 | Iimura | F21V 13/08 | 362/84 |
| 2012/0262915 A1 * | 10/2012 | Lin | F21V 7/0008 | 362/235 |
| 2013/0070464 A1 * | 3/2013 | Shinohara | F21V 19/003 | 362/373 |
| 2017/0051880 A1 * | 2/2017 | Joye | F21V 23/02 | |

* cited by examiner

*Primary Examiner* — Christopher M Raabe

(57) ABSTRACT

The present disclosure provides an LED lamp with a double-segment-nested cup design, the LED lamp comprising a power module and a light source module assembled together; wherein the light source module comprises a first cylindrical cup segment, an LED board and an optical lens module installed inside the first cylindrical cup segment; wherein the power supply module comprises a second cylindrical cup segment, an LED driver and an external power supply connector installed inside the second cylindrical cup segment, and wherein the second cylindrical cup segment is provided with an open end and an opposite convergent end.

20 Claims, 7 Drawing Sheets

LED LAMP WITH A DOUBLE-SEGMENT-NESTED CUP DESIGN

CROSS REFERENCE TO RELATED APPLICATION

This application is a continuation-in-part of PCT Patent Application Ser. No. PCT/CN2023/096462 filed on May 26, 2023, designating the United States, now pending, which claims priority to Chinese patent application Ser. No. 20/231,0028586.1 filed on Jan. 9, 2023, the disclosures of which are incorporated herein by reference in its entirety.

BACKGROUND

1. Field of the Invention

The invention relates to the field of LED light source, in particular to an improved LED lamp with double-segment-nested cup design.

2. Related Art

The LED lamp, such as an LED spotlight, has the advantages of power saving, safety, high brightness, long service life and the like. The MR 16-type LED spotlight is a popular lamp type and is widely applied in a global range, especially in outdoor, such as courtyard landscape illumination, and the traditional, such as halogen MR 16-type LED spotlight is almost replaced by LED one.

At present, the MR 16 spotlight is mainly white, and the brightness is sufficient to replace a halogen lamp. In outdoor courtyard landscape lighting, a color changing MR 16 is desired, preferably with a color light and a white light, and the color brightness needs to be sufficiently bright (the single-color brightness needs to reach around 6 W). At present, a single-color MR 16 and a R/G/B color-changing MR 16 exist on the market, but the power is only about 2 W, such that the brightness is too low, the light mixing effect of white light and color light is poor, and color separation often occurs. In order to improve the performance, some manufacturers adopt the lengthened cup size, and due to the fact that the size exceeds the existing standard, many LED lamps like MR 16-type, fail to match the existing products and the applications, such that the market requirement is difficult to meet.

In addition, at present, most of the MR 16 spotlight adopts a three-section type of a lens, a cup and a joint, the light source is loaded from the front section of the lamp body, and the power supply is arranged from the joint end of the lamp body, with the advantages that the light source and the power supply can be repaired respectively, but with the defects that the space utilization of the inner space of the cup is too low to accommodate a larger-size power supply. If a MR 16 lamp with the profile size meeting the IEC standard or ANSI standard and with enough power is to be achieved, a larger power supply must be contained therein. Therefore, a new challenge is provided for the existing structural design.

Further, in the existing MR 16-type or similar LED lamp, the arrangement of antenna is missing, or, if existed, will induce a metal shielding interference effects, causing an undesired poor wireless regulation/communication effect which needs to be reduced or even eliminated.

In view of the above, an improved LED lamp is urgently needed in the art, so that the above listed technical defects are overcome or at least reduced, and corresponding beneficial technical effects are achieved.

SUMMARY OF THE INVENTION

In view of the above and other inventive concepts, the present disclosure is presented.

According to one of the main concepts of the invention, in the LED lamp of the invention, the inventor innovatively provides a double-segment-nested cup design, so that the contour size required by the related standards is kept, on the other hand, the space utilization of the internal space is improved to accommodate a larger-size power supply, the functions and the performance are met, meanwhile, the convenience, economy and user friendliness of production and maintenance are both considered. Therefore, the technical problems and defects of how to improve the internal space utilization of the LED lamp, the production and maintenance economy, convenience and the like are solved, and the technical advantages are remarkably improved.

According to another concept of the invention, in the LED lamp of the invention, the wireless antenna, such as Bluetooth antenna or the like, can be integrated in the LED lamp with a greatly improved EMC performance, so that the defect that an existing MR 16 lamp cannot be wirelessly regulated/communicated is overcome, and the wireless field control, debugging or longer-distance regulation and control can be more facilitated. More particularly, in the LED lamp of the present disclosure, an innovative antenna improvement design and arrangement are provided, such that metal shielding interference caused to the antenna is reduced or even eliminated.

According to one aspect of the invention, there is provided an LED lamp with a double-segment-nested cup design, the LED lamp comprising a power module and a light source module assembled together, wherein the light source module comprises a first cylindrical cup segment, an LED board and an optical lens module installed inside the first cylindrical cup segment; wherein the power supply module comprises a second cylindrical cup segment, an LED driver and an external power supply connector installed inside the second cylindrical cup segment, and wherein the second cylindrical cup segment is provided with an open end and an opposite convergent end; wherein the first cylindrical cup segment is detachably nested in the open end of the second cylindrical cup segment, and the external power supply connector is arranged in the convergent end; wherein an outer diameter of the first cylindrical cup segment is smaller than or equal to an inner diameter of the open end of the second cylindrical cup segment, and the first cylindrical cup segment is detachably installed in the open end, such that the first cylindrical cup segment is substantially in flush with or exposed outwardly of the open end; and wherein external threads are arranged in an outer peripheral wall of the first cylindrical cup segment, and internal threads are correspondingly arranged in an inner peripheral wall of the second cylindrical cup segment, such that the first cylindrical cup segment and the second cylindrical cup segment are in detachable threaded connection.

According to one embodiment, the LED lamp further comprises a press ring, and the press ring is in circumferential interference fit between the first cylindrical cup segment located radially outward and the optical lens module located radially inward, such that the optical lens module is pressed and fixed to the first cylindrical cup segment through the press ring.

According to one embodiment, the LED board comprises a heat sink substrate and a plurality of LEDs arranged on the heat sink substrate in a COB package.

According to one embodiment, an antenna support and an antenna are further mounted in the first cylindrical cup segment, wherein the antenna is arranged in a holder groove formed between the antenna support and the optical lens module.

According to one embodiment, the first cylindrical cup segment and the second cylindrical cup segment are both formed by a heat-conducting material.

According to one embodiment, the external power supply connector is formed by integrally injection molding of two power supply pins and a plastic bracket, wherein the power supply pins are exposed from one end of the external power supply connector, and the plastic bracket is provided with two wedge-shaped hook heads which are arranged in an other end opposite to the one end of the external power supply connector exposing the power supply pins.

According to one embodiment, inner fins are arranged in an inner peripheral wall of the second cylindrical cup segment, and outer fins are arranged in an outer peripheral wall of the second cylindrical cup segment.

According to one embodiment, a total length and a maximum outer diameter of the LED lamp meet at least one of an IEC 60630-4010-2 standard and an American national standard ANSI C78.24-2001.

According to another aspect of the present disclosure, there is provided an LED lamp with improved antenna design, the LED lamp comprising a optical lens module installed inside a metal shell of the LED lamp, wherein the LED lamp is further provided with an antenna for wireless communication, and wherein a part of the antenna is installed in a way to minimize the surrounding of the metal shell to reduce or substantially eliminate metal shielding interference effect.

According to yet another aspect of the present disclosure, there is provided an LED lamp with a double-segment-nested cup design, the LED lamp comprising a power module and a light source module assembled together; wherein the light source module comprises a first cylindrical cup segment, an LED board and an optical lens module installed inside the first cylindrical cup segment; wherein the power supply module comprises a second cylindrical cup segment, an LED driver and an external power supply connector installed inside the second cylindrical cup segment, and wherein the second cylindrical cup segment is provided with an open end and an opposite convergent end; wherein the first cylindrical cup segment is detachably nested in the open end of the second cylindrical cup segment, and the external power supply connector is arranged in the convergent end; and wherein the LED lamp is further provided with an antenna for wireless communication, and at least one segment of the antenna is installed in a top surface at a light emitting side of the optical lens module or located in the optical lens module close to the top surface.

According to one embodiment, the antenna is strip-shaped, extending outward from inside of the LED lamp and being embedded in a fit groove formed in the top surface.

According to one embodiment, the antenna is installed in the fit groove through a press strip, and the press strip is substantially flush with the top surface after being installed.

According to one embodiment, at least one segment of the antenna is mounted to expose outward from the top surface.

According to one embodiment, a through hole is formed in a circumferential side wall of the optical lens module, and the antenna is arranged to penetrate through the through hole to extend to the top surface.

According to one embodiment, the fit groove is a groove extending diametrically in the top surface, and the antenna extends over an entire length of the fit groove.

According to one embodiment, at least one segment of the antenna is arranged in a position below and close to the top surface.

According to one embodiment, the LED lamp is selected from at least one of the following: an outdoor LED spotlight, a landscape lighting LED lamp, a projection lighting LED lamp and a floodlighting LED lamp. Especially, the LED lamp can be a courtyard LED spotlight, a landscape lighting spotlight, and the like.

According to one embodiment, the first cylindrical cup segment and the second cylindrical cup segment are detachably connected together through screws.

According to one embodiment, the first cylindrical cup segment and the second cup-shaped cup are both formed of a thermally conductive material; and wherein an inner peripheral wall of the second cylindrical cup segment is provided with inner fins, and an outer peripheral wall of the second cylindrical cup segment is provided with outer fins.

According to an embodiment, the LED board comprises a heat sink and a plurality of LEDs packaged on the heat sink.

According to an embodiment, an antenna support and a Bluetooth antenna are further mounted in the first cylindrical cup segment, wherein the Bluetooth antenna is arranged in holder grooves formed between the antenna support and the optical lens module.

According to an embodiment, both the first cylindrical cup segment and the second cylindrical cup segment are formed of a thermally conductive material, such as a metallic material, such as aluminum.

According to one embodiment, the external power supply connector is formed by integrally injection molding of two power supply pins and a plastic bracket, the power supply pin is exposed out of the external power supply connector, and two wedge-shaped hook heads are arranged at the other end of the plastic bracket opposite to the exposed side of the power supply pin.

According to an embodiment, the maximum power of the LED lamp is at least 5-6 watts.

According to an embodiment, both the optical power and the light color of the LED lamp are adjustable.

According to an embodiment, the LED lamp is an MR 16-type spotlight.

More embodiments of the present disclosure can also achieve other non-one-to-one listed advantageous technical effects, which may be partially described below, and could be expectable and understood by those skilled in the art upon reading the present disclosure.

BRIEF DESCRIPTION OF THE DRAWINGS

The above and other features and advantages of the embodiments of the present disclosure, together with others, and the implementation thereof, will be more apparent and better understood by reference to the following brief description of the drawings.

DETAILED DESCRIPTION OF THE EMBODIMENTS

Details of one or more embodiments of the present disclosure will be set forth in the following detailed description in combination with the accompanying drawings. Other features, objects, and advantages of the present disclosure may be apparent from these descriptions, drawings, and claims.

It should be understood that the illustrated and described embodiments are not limited to the details of construction and the arrangement of components set forth in the following description or illustrated in the accompanying drawings. The illustrated embodiments may be other types and can be implemented or practised in various ways. Various examples are provided by interpreting the disclosed embodiments and not by way of limitation. In fact, it will be apparent to those skilled in the art that various modifications and variations can be made to various embodiments of the present disclosure without departing from the scope or spirit of the present disclosure. For example, features illustrated or described as part of one embodiment may be used in or with another embodiment to still produce additional embodiments. Accordingly, the disclosure encompasses such modifications and variations as come within the scope of the appended claims and their equivalents.

The present disclosure is described in more detail below with reference to specific embodiments of the present disclosure.

First Embodiment

Figure 1:
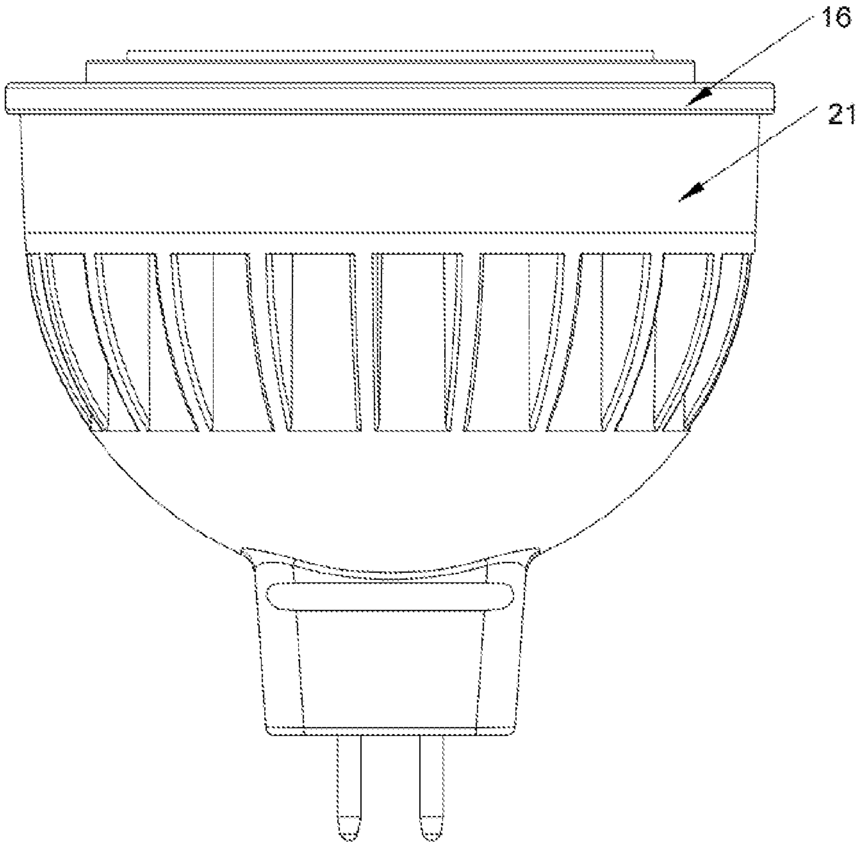
FIG. 1 is a perspective schematic view showing a side surface of an LED lamp having a double-segment-nested cup design according to a first embodiment of the present disclosure.
Figure 2:
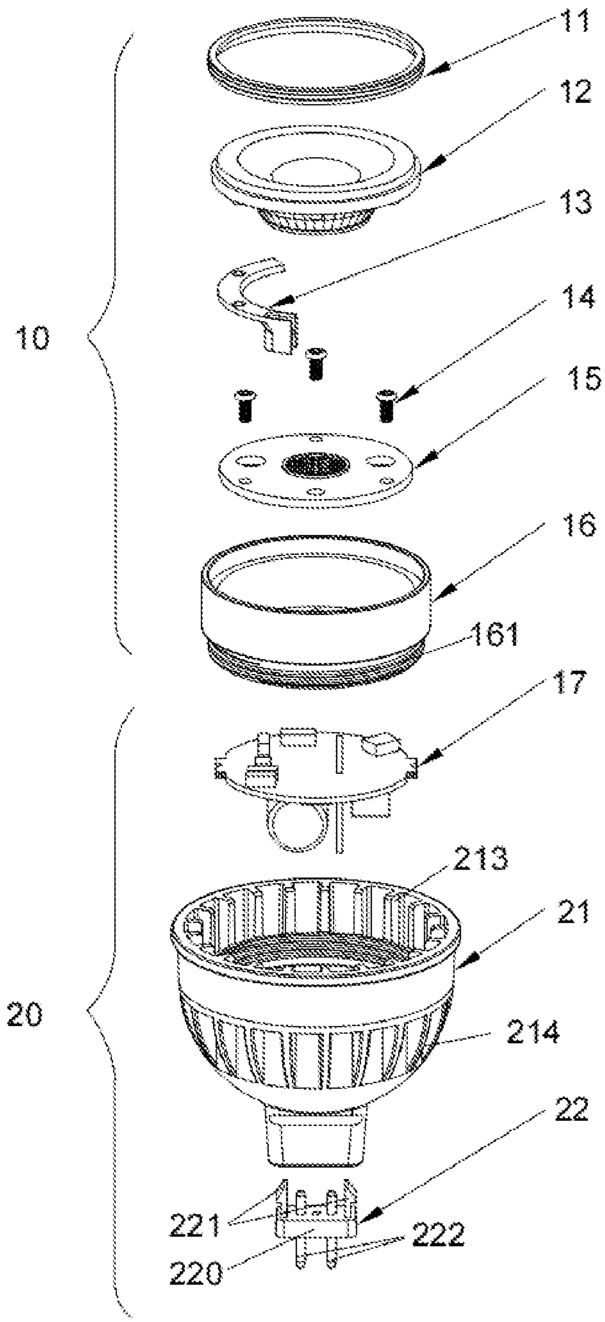
FIG. 2 is an exploded view of the LED lamp of the embodiment shown in FIG. 1, schematically showing the general structure and assembly of the LED lamp.
Figure 3:
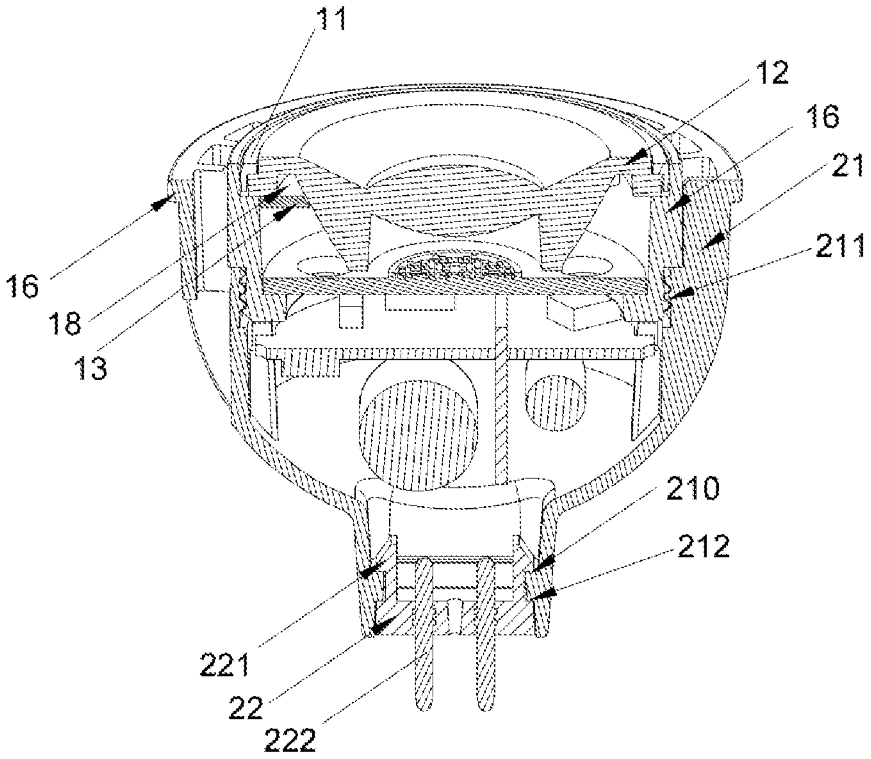
FIG. 3 is a longitudinal sectional view of the LED lamp of the embodiment shown in FIG. 1 along the longitudinal center line of the LED lamp after being assembled, and the schematic structural and partial details of the assembly of the LED lamp are shown schematically.

FIG. 1 is a perspective schematic view showing a side surface of an LED lamp having a double-segment-nested (also referred to as double-layer sleeved) cup according to a first embodiment of the present disclosure. FIG. 2 is an exploded view of the LED lamp shown in FIG. 1, schematically showing the general structure and assembly of the LED lamp. FIG. 3 is a schematic longitudinal sectional view of the LED lamp shown in FIG. 1 along the longitudinal center line of the LED lamp after being assembled, and the schematic construction and the partial details of assembly of the LED lamp are shown schematically.

As shown in FIGS. 1-3, the present disclosure discloses an LED lamp with a double-segment-nested cup design. The LED lamp comprises a power module 20 and a light source module 10, wherein the power module 20 and the light source module 10 are removably or detachably assembled together.

The light source module 10 comprises a first generally cylindrical cup segment 16, an LED board 15 mounted in the first cylindrical cup segment 16, and an optical lens module 12. The LED board 15 mainly comprises a heat sink substrate and a plurality of LEDs mounted on the heat sink such as in a COB (chip-on-board) package manner, and a plurality of optional bonding pads/spots. The number, power, and light colors of the LEDs, e.g., color LEDs and white light LEDs, may vary depending on the customer's requirements and design requirements. The heat sink is preferably a good thermally conductive substrate, such as a ceramic substrate and a metal substrate (e.g., an aluminum substrate) to provide good heat dissipation performance for the LED lamp. The COB package is preferred for a limited cup volume of LED lamps, good heat dissipation design, and increased optical power. According to an example, in the LED lamp of the present disclosure, the LED may be a single-color LED, a colorful LED, and a white light LED, and the light power (brightness) and color of the LED may vary, for example, the color temperature of the white light LED may be adjusted within the range of 2200 K-6000 K, and may be intelligently adjusted in a wireless communication (such as Bluetooth, as described below and without limitation).

In order to achieve a wireless intelligent regulation and control function on the LED lamp, a wireless antenna, such as a Bluetooth antenna, is arranged in or on the LED lamp so as to receive (and/or send) a wireless signal. To this end, according to an example, the antenna support 13 may be mounted in the first cylindrical cup segment 16 to facilitate assembly of the Bluetooth antenna. As shown in FIGS. 2 and 3, the antenna support 13 can be integrally formed by an arcuate segment with support legs formed by plastic injection molding, the support legs of the antenna support 13 are supported on the LED board 15, and the arcuate segment of the antenna support 13 is clamped/supported between the optical lens module 12 and the LED board 15. In this way, the Bluetooth antenna can be reliably arranged (for example, clamped) in the holder groove 18 formed between the optical lens module 12 and the antenna support 13, and located away from the first cylindrical cup segment 16 and the metal-formed LED board 15 (as shown in FIG. 3), avoiding too close to the cup, and hence possible metal shielding interference is reduced as much as possible or eliminated.

According to an example, the maximum optical power of the LED lamp is at least 6 watts, and both the optical power and the light color of the LED lamp are adjustable. For example, the LED lamp can operate with power 6 W when working under any light color, and the high optical power is desirable for some user and is more cost-efficient. In contrast, the power of many similar LED lamp products on the market is insufficient in the aspect of monochromatic luminescence, even only 30% of power of the comparable LED lamp of the present disclosure, namely about 2 W, is close to 6 W only when white light is mixed therein. Therefore, the LED lamp design of the present disclosure can reduce the difficulty of the LED lamp development, and can reduce the production and use cost.

The power module 20 generally comprises an second cylindrical cup segment 21 which is integrally cup-shaped or Chinese small tea cup shaped, an LED driver 17 mounted in the second cylindrical cup segment 21, and an external power supply connector 22. The second cylindrical cup segment 21 has an open end, i.e., the end connected to the first cylindrical cup segment 16, and an opposite convergent end (or called as close-up end), i.e., the end where the external power supply connector 22 is inserted in, for example, in a snap-fit manner. As shown in FIG. 1, the first cylindrical cup segment 16 is detachably assembled, such as nested in or sleeved inside the open end of the second cylindrical cup segment 21, and the external power supply connector 22 is connected to the convergent end, so that after assembly is completed, the LED lamp with the double-layer sleeved or nested cup construction shown in FIGS. 1 and 3 is obtained. To this end, according to one example, the outer diameter of the first cylindrical cup segment 16 is designed to be equal to or slightly smaller than the inner diameter of the open end of the second cylindrical cup segment 21, and the first cylindrical cup segment 16 is detachably assembled inside the open end, such that the first cylindrical cup segment 16 is nearly flush with the open end, or slightly exposed outwardly of the open end in the axial direction (shown in FIG. 3).

As shown in FIGS. 2-3, an illustrative configuration of a detachable nested assembly is that an external thread 161 is designed in at least an outer circumference segment of a first cylindrical cup segment 16, and internal thread 211 is designed at a corresponding assembly part of a second cylindrical cup segment 21, whereby the first cylindrical cup segment 16 and the second cylindrical cup segment 21 are detachably and threadedly connected together, and can be conveniently reversely rotated and disassembled.

As shown in FIGS. 2 and 3, according to an example, the LED lamp can further comprise a metal (such as aluminum) press ring 11, and when the LED lamp is assembled, the aluminum press ring 11 is tightly fitted (in interference fit) in the circumferential direction between a first cylindrical cup segment 16 located radially outward and an optical lens module 12 located radially inward, so that the optical lens module 12 is tightly pressed against the first cylindrical cup segment 16. In this way, the aluminum press ring is fully utilized in that the aluminum press ring is easy to deform and assemble, good heat dissipation performance is achieved, and convenience, low cost, easy disassembly and maintenance can be achieved, the structure of the LED lamp is simplified, and most importantly, the internal space of the LED lamp is greatly saved. Therefore, the lens of the optical lens module 12, whether the concave lens, the convex lens or the plane lens, can be conveniently disassembled, assembled and replaced to meet the requirements of customers and applications, and the whole LED lamp does not need to be customized again, so that the production, design, installation and maintenance cost of the LED lamp is greatly saved, and various benefits are achieved for customers and manufacturers.

In order to ensure good heat dissipation and lifetime of the LED lamp of the present disclosure, according to an example, the first cylindrical cup segment 16 and the second cylindrical cup segment 21 can each be formed of a heat-conducting material, for example a metal material, such as aluminum, which is integrally molded. Moreover, the inner peripheral wall of the second cylindrical cup segment 21 is provided with an inner fin 213, and the outer peripheral wall of the second cylindrical cup segment 21 is provided with an outer fin 214, so as to further facilitate heat dissipation. The inner fins 213 can inherently promote heat dissipation, and due to the fact that the inner fins 213 extend in the axial direction and protrude inwards in the radial direction, the radial interval of a certain axial extension length is further formed between the second cylindrical cup segment 21 and the optical lens module 12, so that the heat dissipation area can be increased, and convection heat dissipation of air can also be promoted more or less.

According to an example, the external power connector 22 is integrally injection-molded with plastic bracket 220 plus two power pins (or called as conductive pins, etc.) 222, so as to retain/maximize the metal portion of the power pin as much as possible, thereby increasing the heat capacity and the heat dissipation area to ensure sufficient heat dissipation and durability. One end of each power supply pin 222 is exposed out of the external power supply connector 22, and the other end of the power supply pin 222 can be electrically connected to the LED driver 17 through an internal electric wire (not shown). The plastic bracket 220 is provided with two wedge-shaped hook heads 221 at the other end opposite to its exposed end. Therefore, when the external power supply connector 22 is assembled, the external power supply connector 22 can be inserted in from the convergent end, so that the wedge-shaped hook head 221 is hooked on and abutted against a step 210 of the second cylindrical cup segment 21, and meanwhile, the step structure (shown in FIG. 3) of the plastic bracket 220 can abut against the other stop step 212 of the second cylindrical cup segment 21, so that the external power supply connector 22 is hooked and engaged at the convergent end of the second cylindrical cup segment 21. When the second cylindrical cup segment 21 is detached, other internal structures of the second cylindrical cup segment 21 can also be detached. In this regard, the wedge-shaped hook head 221 is gripped and moved from top to bottom to disengage from the second cylindrical cup segment 21 shown in FIG. 3, pushing the wedge-shaped hook head 221 outward from the convergent end, and thus disassembly can be completed.

Second Embodiment

The general concept and configuration of the second embodiment is substantially the same as that of the first embodiment, except that the design of the antenna, and the construction and features associated therewith, which might be different.

Figure 4:
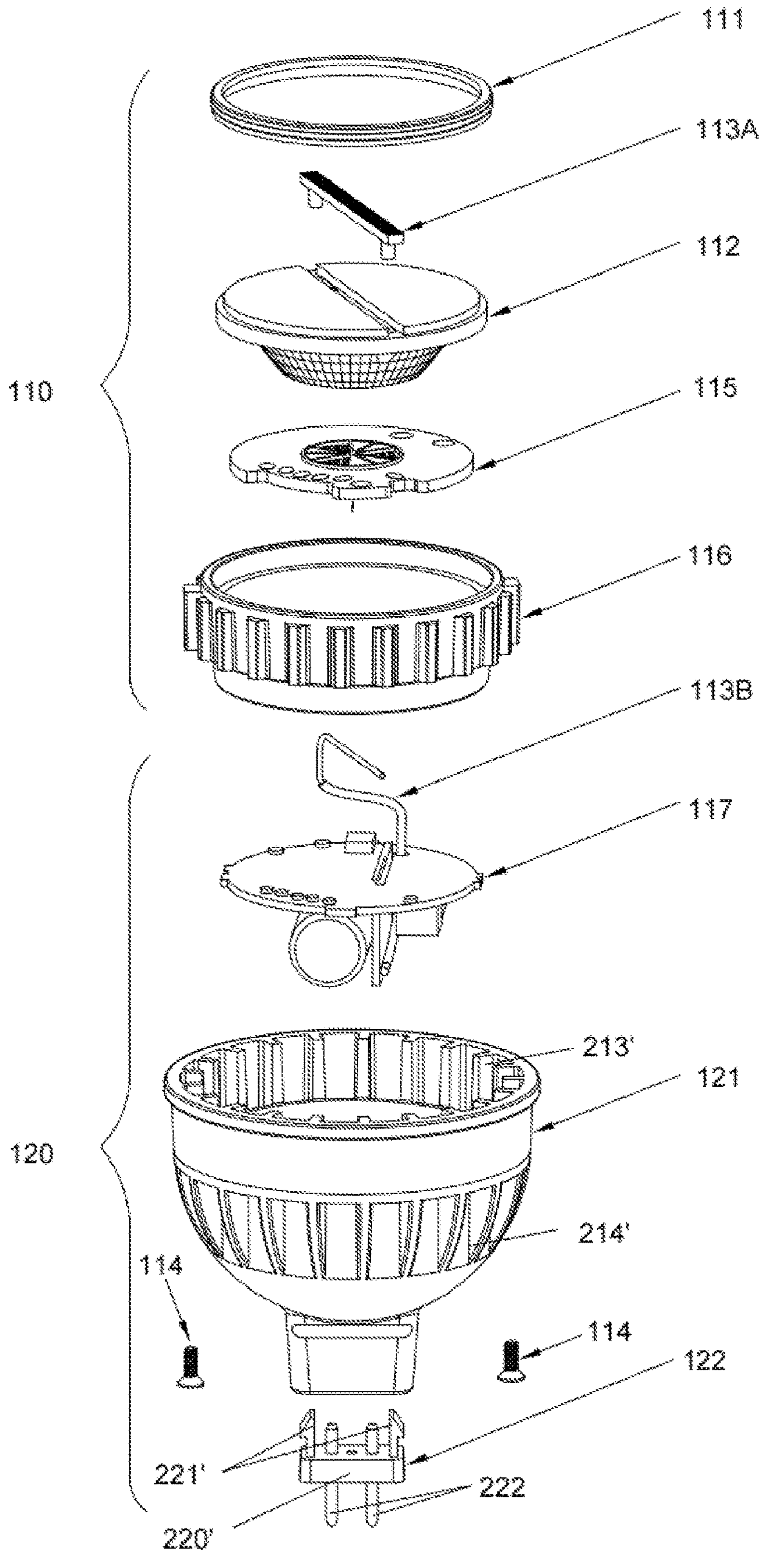
FIG. 4 is an exploded schematic view of the LED lamp with the double-segment-nested cup design according to the second embodiment of the invention, and the general structure and the assembly of the LED lamp are shown schematically.
Figure 5:
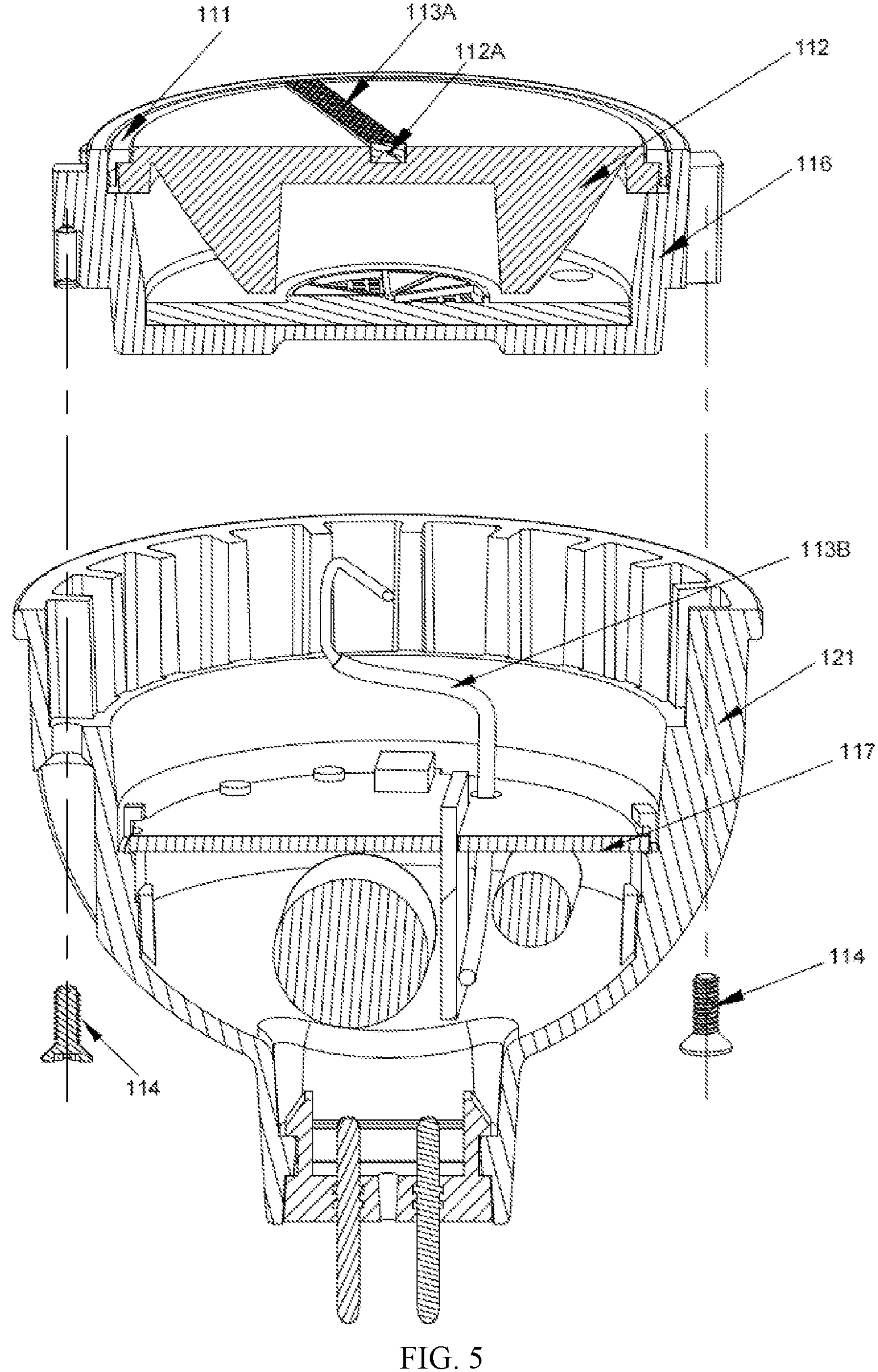
FIG. 5 is an exploded view of the LED lamp of the second embodiment shown in FIG. 4 taken longitudinally along its longitudinal centerline during assembly, generally showing separate first and second cup segments before assembly, and schematically showing a schematic configuration and a partial detail of the assembly of the LED lamp of the second embodiment.
Figure 6:
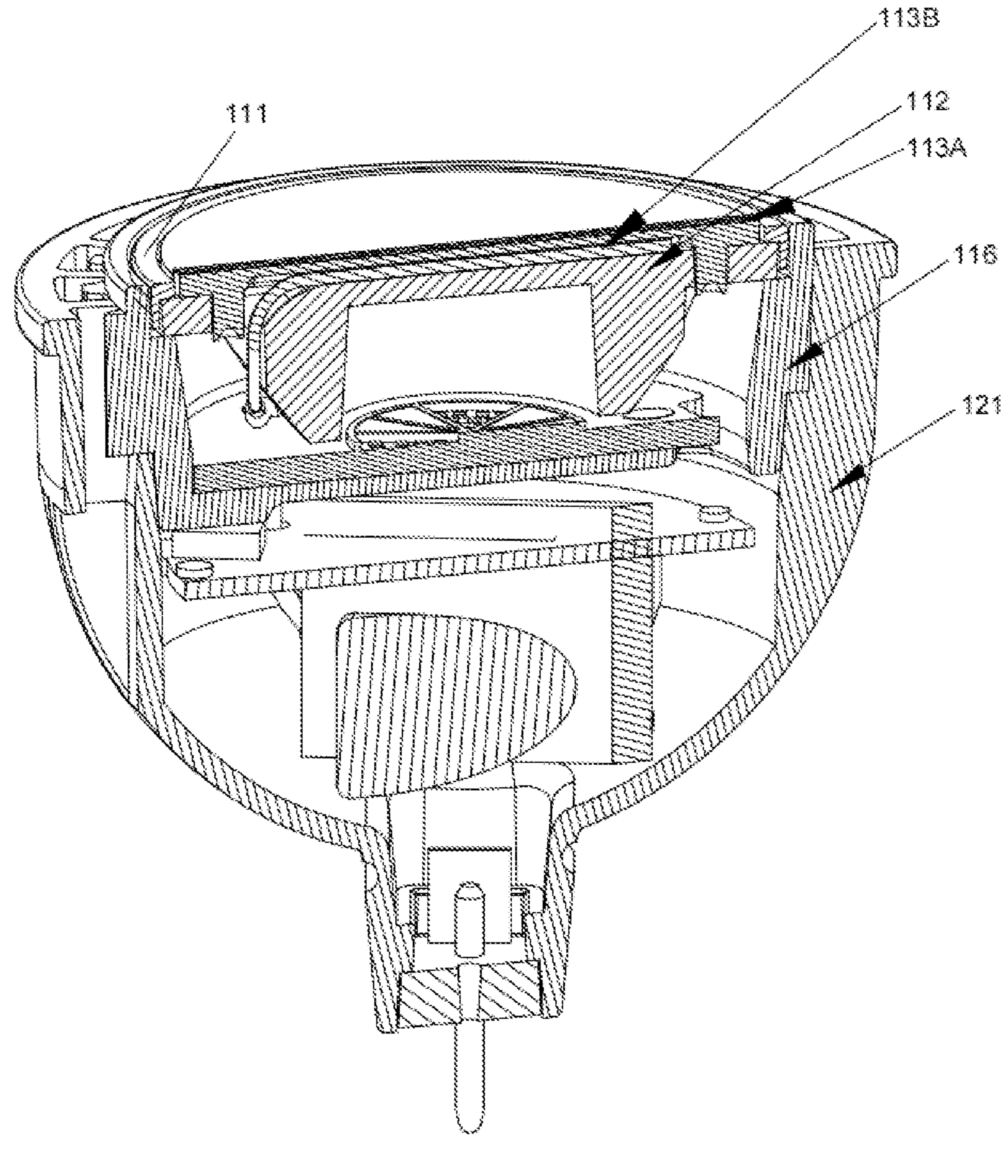
FIG. 6 is an exploded schematic view of the LED lamp assembled in FIG. 5 taken longitudinally along its longitudinal centerline, generally showing the configuration and the positional relationships of the first and second cylindrical cup segments assembled together, and other components.
Figure 7:
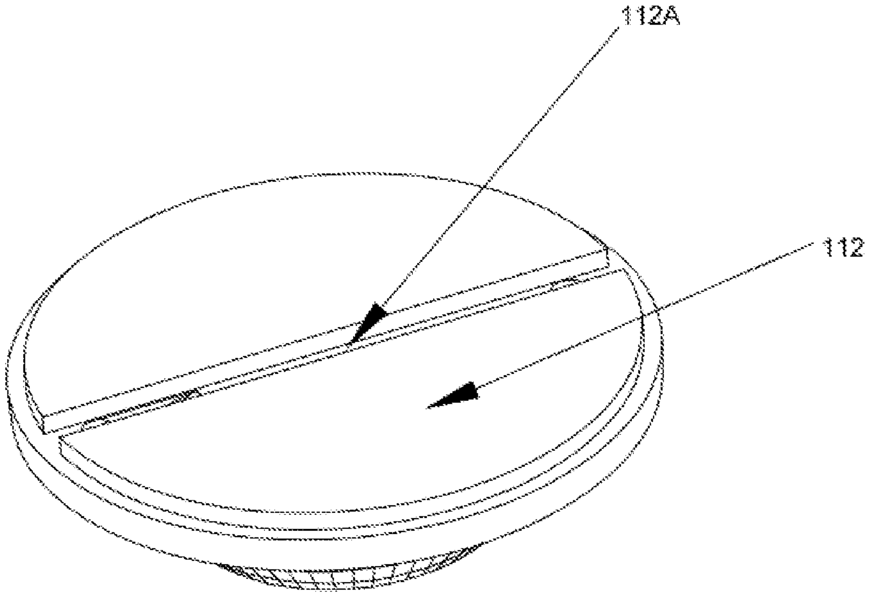
FIG. 7 illustrates a groove formed in a top surface of an optical lens module of an LED lamp of the second embodiment for receiving a sheet strip and an antenna.
Figure 8:
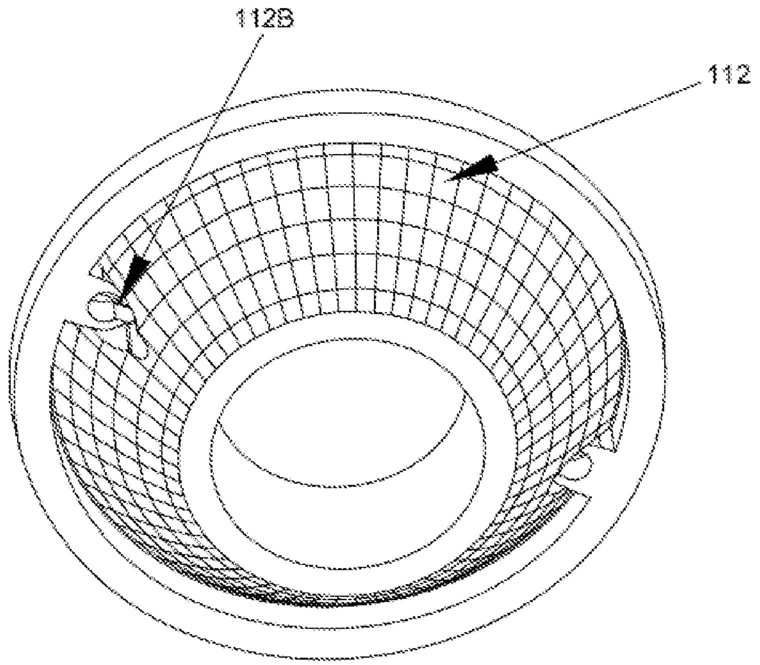
FIG. 8 illustrates a through-hole or a through-groove formed in a circumferential side wall of a generally truncated cone body of an optical lens module of the LED lamp of the second embodiment, constructed for the antenna to pass therethrough during assembly, so that the antenna is mounted to be exposed on the top surface of the optical lens module.

FIGS. 4-8 schematically show the LED lamp with the double-segment-nested cup design according to the second embodiment of the present disclosure. FIG. 4 is an exploded schematic view of the LED lamp with the double-segment-nested cup design according to the second embodiment of the invention, and the general structure and the assembly of the LED lamp are shown schematically. FIG. 5 is an exploded view of the LED lamp of the second embodiment shown in FIG. 4 taken longitudinally along its longitudinal centerline during assembly, generally showing separate first and second cup segments 116 and 121 before assembly, and schematically showing a schematic configuration and a partial detail of the assembly of the LED lamp of the second embodiment. FIG. 6 is an exploded schematic view of the LED lamp assembled in FIG. 5 taken longitudinally along its longitudinal centerline, generally showing the configuration and the positional relationships of the first and second cylindrical cup segments 116 and 121 assembled together, and other components. FIG. 7 illustrates a groove formed in a top surface of an optical lens module 112 of an LED lamp of the second embodiment for receiving a sheet strip and an antenna. FIG. 8 illustrates a through-hole or a through-groove formed in a circumferential side wall of a generally truncated cone body of an optical lens module 112 of the LED lamp of the second embodiment, constructed for the antenna to pass therethrough during assembly, so that the antenna is mounted to be exposed on the top surface of the optical lens module 112.

As shown in FIG. 4 to FIG. 8, an LED lamp having a double-segment-nested (also referred to as a double-layer-sleeved) cup design according to a second embodiment of the present disclosure is shown. The LED lamp comprises a power supply module 120 and a light source module 110, wherein the power supply module 120 and the light source module 110 are detachably or releasably assembled together. The light source module 110 comprises a first generally cylindrical cup segment (which also acts as a heat sink) 116, an LED board 115 mounted inside the first cylindrical cup segment 116, and an optical lens module 112, on the LED board 115 an LED light source is assembled in a COB package manner.

The power module 120 generally comprises an integrally cup-shaped second cylindrical cup segment 121, an LED driver 117 installed in the second cylindrical cup segment 121, and an external power supply joint 122. The second cylindrical cup segment 121 is provided with an open end, namely the end connected with the first cylindrical cup segment 116, and an opposite convergent end (or a closing-up end). As shown in FIG. 4, the first cylindrical cup segment 116 is detachably sleeved or nested inside the open end of the second cylindrical cup segment 121, and the external power supply connector 122 is connected to the convergent end, so that after assembly is completed, the LED lamp with the double-layer sleeved or nested cup construction is obtained. To this end, the outer diameter of the first cylindrical cup segment 116 can be designed to be smaller than or equal to the inner diameter of the open end of the second cylindrical cup segment 121, such that the first cylindrical cup segment 116 can be detachably nested inside the open end, so that the first cylindrical cup segment 116 is nearly flush with the open end, or slightly exposed outwardly of the open end in the axial direction (shown in FIGS. 5 and 6).

As shown, another illustrative configuration of a removable nested assembly is that the first cylindrical cup segment 116 and the second cylindrical cup segment 121 are assembled together in a nested manner and are removably secured together through screws 114 (e.g., two screws 114 as shown in FIGS. 4-5) fixing. According to this detachable screw fixing embodiment of the present disclosure, compared with the design of the thread fit in the first embodiment, the contact between the two heat dissipation bodies 116 and 121 can be as tight as possible, and the contact surface is increased as much as possible, so that the heat dissipation can be improved.

As shown in FIGS. 4-6, according to an example, the LED lamp can further comprise an aluminum press ring 111, and when the LED lamp is assembled, the aluminum press ring 111 is tightly fitted (in interference fit) in the circumferential direction between a first cylindrical cup segment 116 located radially outward and an optical lens module 112 located radially inward, so that the optical lens module 112 is tightly pressed against the first cylindrical cup segment 16. In this way, the aluminum press ring is fully utilized in that the aluminum press ring is easy to deform and assemble, good heat dissipation performance is achieved, and convenience, low cost, easy disassembly and maintenance can be achieved, the structure of the LED lamp is simplified, and most importantly, the internal space of the LED lamp is greatly saved. Therefore, the lens of the optical lens module 112, whether the concave lens, the convex lens or the plane lens, can be conveniently disassembled, assembled and replaced to meet the requirements of customers and applications, and the whole LED lamp does not need to be customized again, so that the production, design, installation and maintenance cost of the LED lamp is greatly saved, and various benefits are achieved for customers and manufacturers.

The first cylindrical cup segment 116 and the second cylindrical cup segment 121 can each be formed of a heat-conducting material, for example a metal material, such as aluminum, which is integrally molded. Moreover, the inner peripheral wall of the second cylindrical cup segment 121 is provided with an inner fin 213', and the outer peripheral wall of the second cylindrical cup segment 121 is provided with an outer fin 214, so as to further facilitate heat dissipation. The inner fins 213' can inherently promote heat dissipation, and due to the fact that the inner fins 213' extend in the axial direction and protrude inwards in the radial direction, the radial interval of a certain axial extension length is further formed between the second cylindrical cup segment 121 and the optical lens module 112, so that the heat dissipation area can be increased, and convection heat dissipation of air can also be promoted more or less.

According to an example, the external power connector 122 is integrally injection-molded with plastic bracket 220' plus two power pins (or called as conductive pins, etc.) 222', so as to retain/maximize the metal portion of the power pin as much as possible, thereby increasing the heat capacity and the heat dissipation area to ensure sufficient heat dissipation and durability. One end of each power supply pin 222' is exposed out of the external power supply connector 122, and the other end of the power supply pin 222' can be electrically connected to the LED driver 117 through an internal electric wire (not shown). The plastic bracket 220' is provided with two wedge-shaped hook heads 221' at the other end opposite to its exposed end. Therefore, with reference to the description and illustration of the first embodiment, when the external power supply connector 122 is assembled, the external power supply connector 122 can be inserted in from the convergent end, so that the wedge-shaped hook head 221' is hooked on and abutted against a step of the second cylindrical cup segment 121, and meanwhile, the step structure of the plastic bracket 220' can abut against another stop step of the second cylindrical cup segment 121, so that the external power supply connector 122 is hooked and engaged at the convergent end of the second cylindrical cup segment 121. When the second cylindrical cup segment 121 is detached, other internal structures of the second cylindrical cup segment 121 can also be detached. In this regard, the wedge-shaped hook head 221' is gripped and moved from top to bottom to disengage from the second cylindrical cup segment 121, pushing the wedge-shaped hook head 221' outward from the convergent end, and thus disassembly can be completed.

The main difference between the second embodiment and the first embodiment is that, the antenna design and the related features of the first embodiment are replaced by the antenna design and the corresponding features shown in FIGS. 4-8. In the design of the LED lamp of the first embodiment, especially with the first and second metal cup segments (generally, the first and second cylindrical cup segments are formed by metal, such as aluminum, in order to improve heat dissipation), due to the well-known electromagnetic shielding effect of the metal cup shell, the wireless communication signal transmitted to/from the antenna of the LED lamp is shielded by the metal cup to a certain extent, so that the signals received by the antenna arranged in the first embodiment are weakened, and the effective signal transmission (or wireless control) distance is short. Therefore, through the design of the inventor and multiple practical tests, by adopting the design in the second embodiment, the antenna 113B is constructed and arranged to be far away from the metal cup (the shell) as much as possible, for example by exposing outward of or from the surface of the LED lamp (such as a light emitting surface of the LED lamp, or an exposed top surface on the light emitting surface of the lens module, etc.), the problem of the electromagnetic shielding and the weakened receiving signal of the antenna design in the first embodiment can be reduced as much as possible, so that a relatively ideal long signal transmission (wireless control) distance is obtained, signal control is greatly improved, without adversely influencing the emitted light beam pattern (light spot).

For this purpose, as shown in FIGS. 5-8, the metal antenna 113B, such as a linear or a thin strip, is mounted and fixed in the LED lamp, for example, in the second metal cup segment 121, connecting it to the circuit board of the LED driver 117, passing it upward through the LED board 115 and through a through hole or slot 112B such as in the circumferential side wall of the generally truncated cone-shaped body of the optical lens module 112 and extending outward from the top surface, bending it and thereafter embeddding it in the fit groove 112A formed in the top surface of the LED lighting lens module 112 in a way extending substantially parallel to the top surface of the optical lens module 112 (i.e. . . . , the surface at the light emitting side of the LED lamp), and securing it in the fit groove 112A by a press strip 113A such as by press fit. It is preferable that after assembly of the metal antenna 113B, the press strip 113A is in substantially flush with the top surface, for the sake of appearance aesthetics, assembly convenience and reliability of the LED lamp. According to one example, after the assembly is completed, the antenna 113B is pressed in the fit groove 112A, so that the antenna 113B is mounted exposed in substantially flush with the top surface of the LED lighting lens module 112 and away from the metal cup, thereby greatly improving the problem of weakened antenna control signals. The fit groove 112A may preferably be, for example, a groove extending diametrically in the circular top surface, not only for EMC consideration, but also for the sake of not affecting the light emitting and the light spot patterns of the optical lens as much as possible. The antenna 113B may extend over at least part of, preferably substantially the entire length of the fit groove 112A to improve wireless signal communication as much as possible. In addition, one example of the press strip 113A may be selected as a metal such that the press strip 113A is in metal connection with the antenna 113B during the press fit, and thus acts as an enlarged portion of the antenna 113B, which may further improve signal reception weakness and signal shielding effects.

According to one example, in the practical test of the inventor, the effective wireless control distance of the LED lamp of the first embodiment is only about 2-3 meters, while the effective wireless control distance of the LED lamp of the second embodiment can reach 10 meters or above.

According to an example, the LED lamp is mainly designed as an MR 16-type LED lamp, such as an LED spotlight, and is typically used for outdoor, such as courtyard landscape illumination. Therefore, according to a preferred example, the LED lamp of the present disclosure is designed such that the total length (or namely the total height of the LED lamp) and the maximum outer diameter of the cup (i.e., the maximum outer diameter of the second cylindrical cup segments 21 and 121 shown in FIGS. 2-3 and 4-6) meet the requirements of IEC 60630-4010-2 standards, so as to meet the requirements of the target customers and markets. The total length of the LED lamp and the maximum outer diameter of the cup according to another example of the present disclosure can be designed to follow the American National Standard ANSI-C78.24-2001, to meet and facilitate the requirements of the United States market and users.

As mentioned above, the LED lamp of the present disclosure can be wirelessly regulated and controlled on its optical power/brightness by means of wireless communication, such as through Bluetooth communication, wherein the optical power/brightness of the LED lamp can be controlled through the MCU or by means of a resistor, etc. The optical power/brightness of the LED lamp is regulated/controlled through the MCU is a good scheme, as the output current can be controlled through different electric control signals by utilizing a preset program in the MCU, so that the design size of the circuit board and the LED lamp can be greatly reduced, and such LED lamp design is very ideal and valuable for those LED lamps meeting related national standard requirements.

The LED lamp according to the present disclosure is suitable for various LED spotlight, for example, an outdoor LED spotlight, especially a high-power outdoor LED spotlight, a courtyard LED spotlight, a landscape lighting LED spotlight, and the like.

The foregoing description of several embodiments of the present disclosure is presented for purposes of illustration. The foregoing description is not intended to be exhaustive or to limit the present disclosure to the precise construction and/or forms disclosed, obviously, many modifications and variations can be made in accordance with the teachings herein. The scope and all equivalents of the present disclosure are intended to be defined by the appended claims.

What is claimed is:

1. An LED lamp with a double-segment-nested cup design, the LED lamp comprising a power module and a light source module assembled together, wherein the light source module comprises a first cylindrical cup segment, an LED board and an optical lens module installed inside the first cylindrical cup segment;

wherein the power supply module comprises a second cylindrical cup segment, an LED driver and an external power supply connector installed inside the second cylindrical cup segment, and wherein the second cylindrical cup segment is provided with an open end and an opposite convergent end;

wherein the first cylindrical cup segment is detachably nested in the open end of the second cylindrical cup segment, and the external power supply connector is arranged in the convergent end;

wherein an outer diameter of the first cylindrical cup segment is smaller than or equal to an inner diameter of the open end of the second cylindrical cup segment, and the first cylindrical cup segment is detachably installed in the open end, such that the first cylindrical cup segment is substantially in flush with or exposed outwardly of the open end; and wherein external threads are arranged in an outer peripheral wall of the first cylindrical cup segment, and internal threads are correspondingly arranged in an inner peripheral wall of the second cylindrical cup segment, such that the first cylindrical cup segment and the second cylindrical cup segment are in detachable threaded connection.

2. The LED lamp according to claim 1, wherein the LED lamp further comprises a press ring, and the press ring is in circumferential interference fit between the first cylindrical cup segment located radially outward and the optical lens module located radially inward, such that the optical lens module is pressed and fixed to the first cylindrical cup segment through the press ring.

3. The LED lamp according to claim 1, wherein the LED board comprises a heat sink substrate and a plurality of LEDs arranged on the heat sink substrate in a COB package.

4. The LED lamp according to claim 1, wherein an antenna support and an antenna are further mounted in the first cylindrical cup segment, wherein the antenna is arranged in a holder groove formed between the antenna support and the optical lens module.

5. The LED lamp according to claim 1, wherein the LED lamp is further provided with an antenna for wireless communication, and at least one segment of the antenna is installed in a top surface at a light emitting side of the optical lens module, or located in the optical lens module close to the top surface.

6. The LED lamp according to claim 1, wherein the external power supply connector is formed by integrally injection molding of two power supply pins and a plastic bracket, wherein the power supply pins are exposed from one end of the external power supply connector, and the plastic bracket is provided with two wedge-shaped hook heads which are arranged in an other end opposite to the one end of the external power supply connector exposing the power supply pins.

7. The LED lamp according to claim 1, wherein inner fins are arranged in an inner peripheral wall of the second cylindrical cup segment, and outer fins are arranged in an outer peripheral wall of the second cylindrical cup segment.

8. The LED lamp according to claim 1, wherein a total length and a maximum outer diameter of of the LED lamp meet at least one of an IEC 60630-4010-2 standard and an American national standard ANSI C78.24-2001.

9. An LED lamp with a double-segment-nested cup design, the LED lamp comprising a power module and a light source module assembled together;

wherein the light source module comprises a first cylindrical cup segment, an LED board and an optical lens module installed inside the first cylindrical cup segment;

wherein the power supply module comprises a second cylindrical cup segment, an LED driver and an external power supply connector installed inside the second cylindrical cup segment, and wherein the second cylindrical cup segment is provided with an open end and an opposite convergent end;

wherein the first cylindrical cup segment is detachably nested in the open end of the second cylindrical cup segment, and the external power supply connector is arranged in the convergent end; and wherein the LED lamp is further provided with an antenna for wireless communication, and at least one segment of the antenna is installed in a top surface at a light emitting side of the optical lens module, or located in the optical lens module close to the top surface.

10. The LED lamp according to claim 9, wherein the antenna is strip-shaped, extending outward from inside of the LED lamp and being embedded in a fit groove formed in the top surface.

11. The LED lamp according to claim 10, wherein the antenna is installed in the fit groove through a press strip, and the press strip is substantially flush with the top surface after being installed.

12. The LED lamp according to claim 11, wherein at least one segment of the antenna is mounted to expose outward from the top surface.

13. The LED lamp according to claim 10, wherein a through hole is formed in a circumferential side wall of the optical lens module, and the antenna is arranged to penetrate through the through hole to extend to the top surface.

14. The LED lamp according to claim 10, wherein the fit groove is a groove extending diametrically in the top surface, and the antenna extends over an entire length of the fit groove.

15. The LED lamp according to claim 9, wherein at least one segment of the antenna is arranged in a position below and close to the top surface.

16. The LED lamp according to claim 9, wherein a total length and a maximum outer diameter of of the LED lamp meet at least one of an IEC 60630-4010-2 standard and an American national standard ANSI C78.24-2001.

17. The LED lamp according to claim 9, wherein the LED lamp is selected from at least one of the following: an outdoor LED spotlight, a landscape lighting LED lamp, a projection lighting LED lamp and a floodlighting LED lamp.

18. The LED lamp according to claim 9, wherein the first cylindrical cup segment and the second cylindrical cup segment are detachably connected together through screws.

19. The LED lamp according to claim 9, wherein the first cylindrical cup segment and the second cup-shaped cup are both formed of a thermally conductive material; and wherein an inner peripheral wall of the second cylindrical cup segment is provided with inner fins, and an outer peripheral wall of the second cylindrical cup segment is provided with outer fins.

20. The LED lamp according to claim 9, wherein The LED lamp further comprises a press ring, and the press ring is in circumferential interference fit between the first cylindrical cup segment located radially outward and the optical lens module located radially inward, such that the optical lens module is pressed and fixed to the first cylindrical cup segment through the press ring.

* * * * *